US007836504B2

(12) United States Patent
Ray et al.

(10) Patent No.: US 7,836,504 B2
(45) Date of Patent: Nov. 16, 2010

(54) ON-ACCESS SCAN OF MEMORY FOR MALWARE

(75) Inventors: Kenneth D Ray, Seattle, WA (US); Michael Kramer, Yonkers, NY (US); Paul England, Bellevue, WA (US); Scott A Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 11/070,468

(22) Filed: Mar. 1, 2005

(65) Prior Publication Data

US 2006/0200863 A1    Sep. 7, 2006

(51) Int. Cl.
G06F 11/00 (2006.01)
G06F 12/14 (2006.01)
G06F 12/16 (2006.01)
G06B 23/00 (2006.01)

(52) U.S. Cl. .................. 726/24; 711/202; 711/217; 714/15; 714/6; 714/38; 726/22; 726/23; 726/25; 726/1; 713/168; 713/176

(58) Field of Classification Search ................ 726/24
See application file for complete search history.

(56) References Cited

U.S. PATENT DOCUMENTS

| | | | | |
|---|---|---|---|---|
| 2002/0144129 | A1* | 10/2002 | Malivanchuk et al. | 713/188 |
| 2003/0115479 | A1* | 6/2003 | Edwards et al. | 713/200 |
| 2004/0015712 | A1* | 1/2004 | Szor | 713/200 |
| 2004/0064668 | A1* | 4/2004 | Kjos et al. | 711/202 |
| 2004/0158729 | A1* | 8/2004 | Szor | 713/200 |
| 2004/0168070 | A1* | 8/2004 | Szor | 713/188 |
| 2005/0055558 | A1* | 3/2005 | Carmona | 713/188 |
| 2006/0130141 | A1* | 6/2006 | Kramer et al. | 726/23 |

OTHER PUBLICATIONS

Peter Szor "Memory Scanning Under Windows NT", Virus Bulletin Conference, Sep. 1999.*

* cited by examiner

Primary Examiner—Christopher A Revak
Assistant Examiner—Bryan Wright
(74) Attorney, Agent, or Firm—Workman Nydegger

(57) ABSTRACT

The present invention provides a system, method, and computer-readable medium for identifying malware that is loaded in the memory of a computing device. Software routines implemented by the present invention track the state of pages loaded in memory using page table access bits available from a central processing unit. A page in memory may be in a state that is "unsafe" or potentially infected with malware. In this instance, the present invention calls a scan engine to search a page for malware before information on the page is executed.

17 Claims, 5 Drawing Sheets

ON-ACCESS SCAN OF MEMORY FOR MALWARE

FIELD OF THE INVENTION

The present invention relates to computing devices and, more particularly, to protection of computing devices against malware.

BACKGROUND OF THE INVENTION

As more and more computers and other computing devices are interconnected through various networks such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

When a computing device is attacked or "infected" by computer malware, the adverse results are varied, including disabling system devices; erasing or corrupting firmware, applications, or data files; transmitting potentially sensitive data to another location on the network; shutting down the computing device; or causing the computing device to crash. Yet another pernicious aspect of many, though not all, computer malware is that an infected computing device is used to infect other systems.

A traditional defense against computer malware, and particularly computer viruses and worms, is antivirus software. Generally described, antivirus software scans information, looking for identifiable patterns associated with known computer malware. Also, increasingly, antivirus software utilizes heuristic techniques that compare detectable behaviors with characteristics of malware. Upon detecting a computer malware, the antivirus software may respond by removing the computer malware from the infected information, quarantining the information, or deleting the infected information.

Most antivirus software identifies malware by matching patterns within the information to what is referred to as a "signature" of the malware. Typically, antivirus software scans for malware signatures when certain events are scheduled to occur, such as when information is going to be written to or read from an input/output ("I/O") device. As known to those skilled in the art and others, computer users have ongoing needs to read and write information to I/O devices, such as hard drives, floppy disks, compact disks ("CDs"), etc. For example, a common operation provided by most software applications is to open a file stored on a hard drive and display the contents of the file on a computer display. However, since opening a file may cause malware associated with the file to be executed, antivirus software applications typically perform a scan or other analysis of the file before the open operation is satisfied. If malware is detected, the antivirus software application that performed the scan may prevent the malware from being executed—for example, by causing the open operation to fail.

Unfortunately, as antivirus software has become more sophisticated and efficient at recognizing thousands of known computer malware, so, too, has the computer malware become more sophisticated. As a result, existing antivirus software suffers from several inadequacies, including, but not limited to, (1) known malware is able to avoid being detected by antivirus software using methods that conceal the malware, either by hiding the true nature of the malware or by gaining access to the computing device at an entry point that is not monitored by antivirus software; (2) antivirus software may be slow as all incoming and outgoing information may be scanned at connections such as network ports, even though some of the information may not be capable of causing harm to a computing device; and (3) development of malware detection techniques for handling previously unknown malware is difficult and costly.

As mentioned previously, some known malware is able to avoid being detected by antivirus software using methods that conceal the malware, either by hiding the true nature of the malware or by gaining access to the computing device at an entry point that is not monitored by antivirus software. For example, malicious computer users (e.g., hackers, crackers, etc.) recognize that antivirus software scans for malware when a user schedules information to be written or read from an I/O device such as a hard drive. As a result, some malicious computer users now encrypt malware or perform other actions to obscure the malware signature behind random patterns. For example, when a user schedules infected information to be executed, the encrypted malware is loaded into computer memory. A component of the malware, sometimes referred to as a decryption routine, gains control of the computing device and decrypts the previously encrypted program code that implements the malicious functionality of the malware (sometimes referred to as a "payload"). Only when the payload is decrypted is a malware signature recognizable. In this example, the malicious functionality of the malware is hidden when the malware is located on an I/O device such as a disk. Moreover, the malicious functionality of the malware is only detectable when the malware is loaded in memory and decrypted by the decryption routine. Since existing antivirus software does not scan for malware when information is modified in memory, the malware may not be detected by these existing systems. As known to those skilled in the art and others, this is just one example in which malware is able to circumvent the protections provided by antivirus software.

In other instances, the malware is configured to be directly loaded in memory, thereby bypassing entry points that are monitored by existing antivirus software. For example, some malware avoids being stored on an I/O device and therefore avoids being scanned by antivirus software by exploiting a vulnerability in a benevolent application program that is already loaded in memory. More specifically, a vulnerability in the benevolent application program is exploited and the area of memory allocated to the program is modified or otherwise corrupted by the malware. Then the malware may be directly executed from the memory allocated to the program without being written to an I/O device. As a result, information that was identified as being safe to execute when initially loaded into memory may subsequently be modified with malicious program code. When a computer malware gains access to a computing device using this type of attack, the potential damage to the computing device is significant as the benevolent application "hijacked" by the malware may be a highly trusted application running with system and/or administrator privileges. As a result, the malware may inherit the same trust level of the benevolent application.

Unfortunately, as mentioned above, existing antivirus software scans all incoming and outgoing information from a computing device for malware. As a result, the antivirus software is inefficient and resource intensive as all of the information that is transmitted over a communication system such as a network port is scanned, even though some of the information may not be capable of implementing the malicious acts of malware. In this instance, the antivirus software does not take advantage of resources provided by a computing device for distinguishing between information that may or may not be executed.

Development of malware detection techniques for handling previously unknown malware is difficult and costly. One possible method of protecting a computing device from unknown malware is to develop a set of heuristics that measures the degree to which data is "suspicious" or maintains attributes that are characteristic of malware. However, developing a set of heuristics based on existing technology in which information is scanned for malware at the entry points of a computing device is inefficient. For example, there are many possible ways for malware to gain access to a computing device. Unfortunately, a different set of heuristics may be needed at each entry point to detect malware. However, there are fewer ways to perform malicious acts after malware has been converted into program code that may be executed by the computing device. As a result, antivirus software would be more efficient and accurate in detecting previously unknown malware using heuristic techniques that scan program code in memory before the information is executed.

One possible method of protecting a computing device from the exemplary malware exploits described above is to make executable program code "read-only" once loaded in memory. In this instance, the program code would not be susceptible to modification from malware. However, this method is not feasible as legitimate application programs (e.g., virtual machine emulators and the like) have legitimate reasons for causing self-modifying program code to be loaded into memory. Thus, making executable program code read-only would unduly restrict application programs.

What is needed is a system that searches memory, including program code that is modified in memory as a result of program execution, for information and/or behaviors that are characteristic of malware before the malware is capable of being executed. Furthermore, what is needed is a system that monitors changes made to program code loaded in memory and validates the trustworthiness of those changes. Any system that addresses the above-described problems in the prior art should not prevent normal access to information in memory. Also, any such system should not require performing a scan every time the memory is accessed so that a computing device may maintain a reasonable performance level.

SUMMARY OF THE INVENTION

The present invention provides a system, method, and computer-readable medium for identifying malware from pages of information that are loaded in memory. The malware may be detected regardless of how the malware gains access to the computing device. For example, malware that avoids detection using encryption, exploits a vulnerability in an application program that is already in memory, or gains access to a computing device through any other means devised by malware authors may be identified by the present invention. Also, since the present invention only scans data in memory, the performance of antivirus software may be improved over the prior art. For example, in instances when the computing device is able to distinguish between an executable and a nonexecutable page of memory, only executable information that is capable of exposing a computing device to the effects of malware may be scanned. Finally, the present invention provides a more effective infrastructure than existing technologies for detecting previously unknown malware. For example, while there are many different ways for malware to gain access to a computing device and prevent a malware signature from being detected, there is a limited set of ways for malware to perform malicious acts. Since the present invention scans the contents of memory for malware just prior to a malicious act being "executed," the invention provides an effective infrastructure for identifying unknown malware using heuristics.

One aspect of the present invention is a method that utilizes the resources provided by computer hardware that regulates access to memory to track the state of pages loaded in memory. When a process makes a request to access a page in memory, such as a request to read, write, or execute information on a page, and the access bits associated with the page do not permit the type of access requested, a software routine such as page fault handler is invoked. Typically, a page fault handler performs services for a process when the process makes a request to access a page in a way that is not permitted by the page table access bits. For example, a page fault handler will typically perform memory management tasks, retrieve data that was "paged out" on disk and the like.

The present invention uses an existing infrastructure for invoking a page fault handler to (1) track the state of a page loaded in memory, (2) cause a scan engine to perform a scan if the computing device may be exposed to the effects of malware; and (3) update the page table access bits that regulate the ability of a process to access the page. When a page is first loaded in memory or modified while in memory, the page is in a state that is not safe (e.g., potentially infected with malware). In instances when a page is not in a safe state, the access bits associated with the page are set so that if the process attempts to access the page, the page fault handler is invoked. When satisfying a request has the potential to expose the computing device to the effects of malware, the page fault handler causes a scan of the page to be performed before allowing the request to be satisfied. If malware is identified, the method will perform exception processing that may include, but is not limited to, killing one or more processes, shutting down the operating system, reporting the infection, and notifying the user of the malware. If the scan engine does not identify malware, the page table access bits that define the access rights of the process to the page, including the ability of the process to execute information on the page, will be modified. In some instances, the process may access the page without the page fault handler being invoked and an additional scan for malware being performed. More specifically, if the process does not write or otherwise modify data on a page that is in a safe state, thereby compromising the integrity of the page, the process may continue to access the page.

In one exemplary embodiment, the present invention is implemented in a computing device that supports both writable and readable access bits. When a page is first loaded in memory, the page is in a state that is not safe. In this instance, the access bits associated with the page are set so that if a process attempts to access the page, a page fault handler is invoked. In this embodiment, the page fault handler determines whether satisfying the request has the potential to expose the computing device to the effects of malware. When satisfying the request has the potential to expose the computing device to the effects of malware, the page fault handler causes a scan of the page for malware to be performed before allowing the request to be satisfied. If the scan engine does not identify malware on the page, the page transitions into a state that is deemed safe with an update to the page table access bits. For example, the readable access bit will be set to true and the writable access bit will be set to false in order to both regulate the ability of the process to access the page and represent that the page is in a safe state. While the page is in a safe state, information on the page may be read and/or executed without the page fault handler being invoked. However, if information is written to the page or the contents of the page are otherwise modified, the page fault handler is invoked. In this instance, the page fault handler sets the writable bit to true and the readable bit to false to regulate the ability of the process to access the page and represent that the page is not in a safe state. As mentioned above, before a page transitions from a state that is not safe to a safe state, the page fault handler is invoked which causes the page to be scanned for malware.

In yet another embodiment, the present invention is implemented in a computing device that supports a writable bit and an executable bit. When a page is first loaded in memory, the page is in a state that is not safe. In this instance, the access bits associated with the page are set so that if a process attempts to access the page, a page fault handler is invoked. In this embodiment, the page fault handler determines whether satisfying the request has the potential to expose the computing device to the effects of malware. When satisfying the request has the potential to expose the computing device to the effects of malware, the page fault handler causes a scan of the page for malware to be performed, before allowing the request to be satisfied. If the scan engine does not identify malware on the page, the page transitions into a state that is deemed safe with an update to the page table access bits. For example, the executable access bit will be set to true and the writable access bit will be set to false in order to both regulate the ability of the process to access the page and represent that the page is in a safe state. While the page is in a safe state, information on the page may be executed without the page fault handler being invoked. However, if information is written to the page or the contents of the page are otherwise modified, the page fault handler is invoked. In this instance, the page fault handler sets the writable bit to true and the executable bit to false to regulate the ability of the process to access the page and represent that the page is not in a safe state. As mentioned above, before a page transitions from a state that is not safe to a safe state, the page fault handler is invoked, which causes the page to be scanned for malware.

In still another embodiment, a computer-readable medium is provided with contents, i.e., a program that causes a computing device to operate in accordance with the method described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a system, method, and computer-readable medium for identifying malware that is loaded in the memory of a computing device. Software routines implemented by the present invention track the state of pages loaded in memory using page table access bits available from a central processing unit. A page in memory may be in a state that is unsafe or potentially infected with malware. In this instance, the present invention calls a scan engine to search the page for malware before the page with unsafe information is read and/or executed. If the scan engine does not identify malware, the page transitions into a state that is safe. In this instance, information on the page that is in the safe state may be read and/or executed without the page changing states. However if new information is written to a page, the page will transition back to a state that is unsafe. Thus, pages that are modified as a result of program execution or pages that are "hijacked" by malware are scanned prior to being read and/or executed.

Although the present invention will primarily be described in the context of identifying malware in a computing device that stores information in units typically known as pages, those skilled in the relevant art and others will appreciate that the present invention is also applicable to other types of computing devices which store and recall information using different techniques. The following description first provides an overview of an antivirus system as found in the prior art and a system in which the present invention may be implemented. Then a method that implements the present invention and state diagrams that illustrate aspects of the method are described. The illustrative examples provided herein are not intended to be exhaustive or to limit the invention to the precise forms disclosed. Similarly, any steps described herein may be interchangeable with other steps or combinations of steps in order to achieve the same result.

Figure 1:
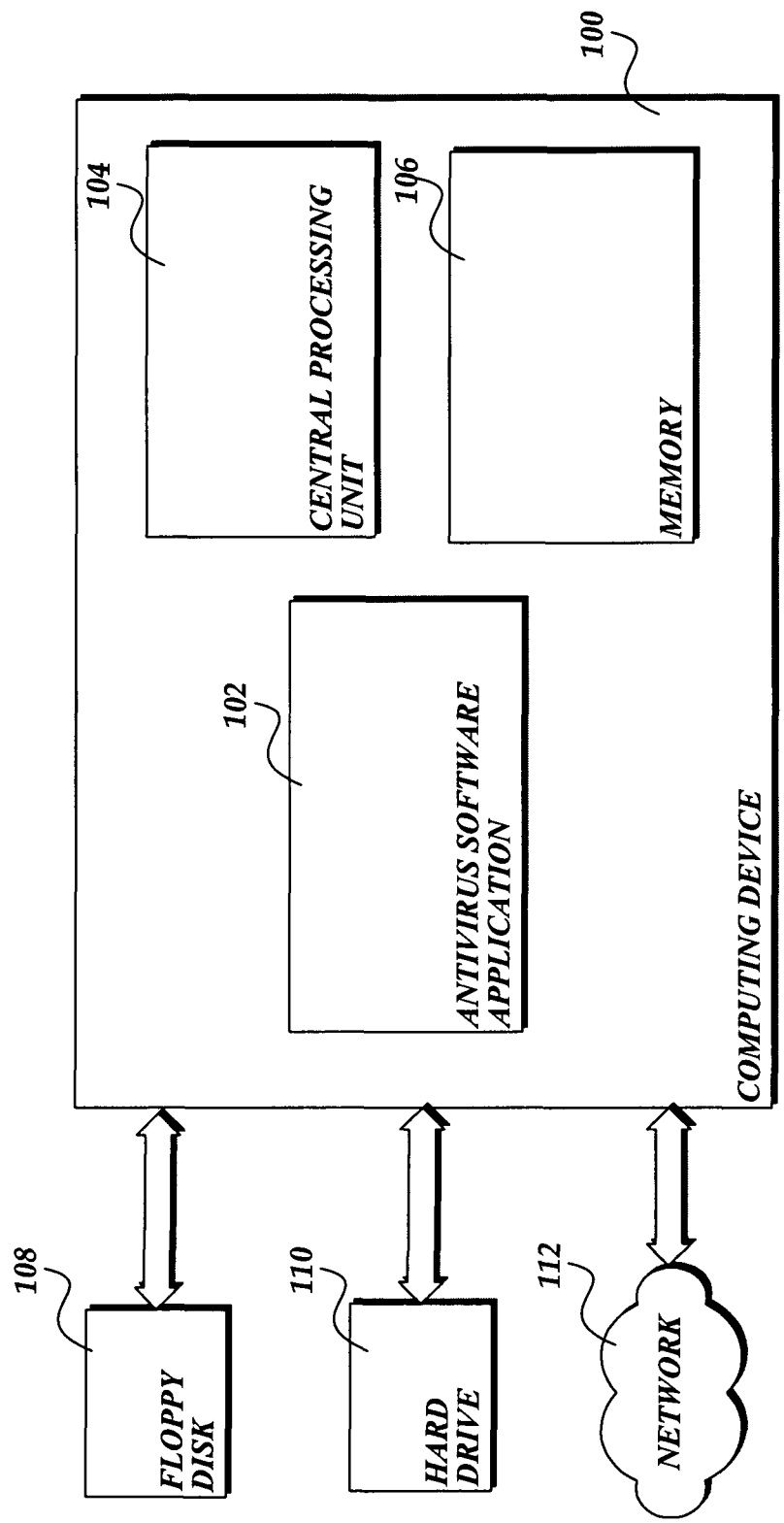
FIG. 1 is a block diagram that illustrates components of a computing device that are operative to search for malware using techniques found in the prior art.

Referring now to FIG. 1, the following is intended to provide an exemplary overview of one suitable computing device 100 that is operative to search for malware using techniques found in the prior art. More specifically, the illustrated computing device 100 is comprised of an antivirus software application 102, a central processing unit ("CPU") 104, and a memory 106. Also, FIG. 1 illustrates a floppy disk 108, hard drive 110, and network 112 that are each associated with the computing device 100. Since many components and functions of the computing device 100 are not important for an understanding of the present invention, they are not illustrated in FIG. 1 or described in the accompanying text.

As known to those skilled in the art and others, existing antivirus software, such as antivirus software application 102, scans for malware when "I/O" is scheduled to occur on a computing device. In this instance, a request to perform ("I/O") with a hardware device, such as the floppy disk 108 or hard drive 110, may be generated from a user application.

Prior to the request being satisfied, the antivirus software application 102 is notified that the I/O request is scheduled to be satisfied. In response, the antivirus software application 102 compares information that is associated with the I/O request to known malware signatures. Also, antivirus software may be configured to perform additional types of analysis in order to determine if information associated with an I/O request is malware. For example, some antivirus software "emulates" program execution to detect behaviors that are characteristic of malware. In any event, a scan for malware typically occurs when I/O is scheduled to occur. Also, some antivirus software performs scans for malware when information will be transmitted via a network connection using a specific protocol. For example, the computing device 100 may receive an e-mail message from a remote computing device through the network 112. In this instance, the antivirus software application 102 may scan or otherwise analyze the incoming e-mail to determine if information associated with the e-mail is infected with malware.

As illustrated in FIG. 1, the computing device 100 includes a CPU 104. Those skilled in the art and others will recognize that the CPU 104 serves as the computational center of the computing device 100 by supporting the execution of program code. Most malware carries out its malicious functionality when malware program code is "executed" by the CPU 104. As known to those skilled in the art and others, modern CPUs follow a "fetch and execute" cycle wherein program code is sequentially "fetched" from memory 106 and then "executed." Thus, in order for most, if not all, malware to carry out its' malicious functionality, program code associated with the malware is loaded in memory 106 and made available to the CPU 104.

Malware uses various stealth techniques in order to be loaded into memory 106 and executed by the CPU 104. For example, one type of malware, commonly known as a virus, attaches itself to an innocuous host, such as a word processing document, in order to deceive a user into causing the malware to be executed. When a malware-infected host is scheduled for execution, program code associated with the malware is loaded into memory 106 and executed. In addition, malicious computer users (e.g., hackers, crackers, and the like) recognize that antivirus software scans for malware when information is accessed from certain entry points such as a disk or a specific type of network connection. As a result, some malicious computer users encrypt malware or otherwise obscure a malware signature until after the malware is loaded in memory. In this instance, decryption of the malware may occur as a result of program execution after the antivirus software 102 performs a scan for the malware.

Also, as mentioned previously, some malware exploits "hijack" existing processes by identifying circumstances in which information scheduled for execution may be overwritten. For example, in an exploit commonly known as a buffer overflow, a malicious computer user identifies an existing operation that copies bytes of information to a buffer in memory. In this instance, a limited segment of memory is allocated to the buffer and a check to determine whether the allocated memory is sufficient to complete the operation is not performed. As a result, a malware author may cause excess information to overwrite the buffer into a segment of memory allocated to information that is scheduled to be executed. In this way, the malware author may cause program execution to jump to a location in memory that is associated with malware. Since the malware was not scheduled for execution in the normal way, antivirus software may not perform a scan for the malware.

Even though malware may gain access to the computing device 100 using any one of a number of known techniques—and probably a large number of yet to be discovered techniques—all malware that is capable of causing damage to a computing device has certain properties. For example, all malware will eventually be converted into native program code that is understandable to a CPU and loaded into memory 106. Stated differently, regardless of whether malware becomes resident on the computing device 100 through the floppy disk 108, the hard drive 110, the network 112, or other entry point, the malware is eventually converted into binary program code and loaded into memory 106 before the computing device 100 may be exposed to the harmful effects of the malware. Existing antivirus software typically scans for malware at the entry points where malware may gain access to the computing device 100. By contrast, the present invention is directed to scanning the contents of memory for malware.

Figure 2:
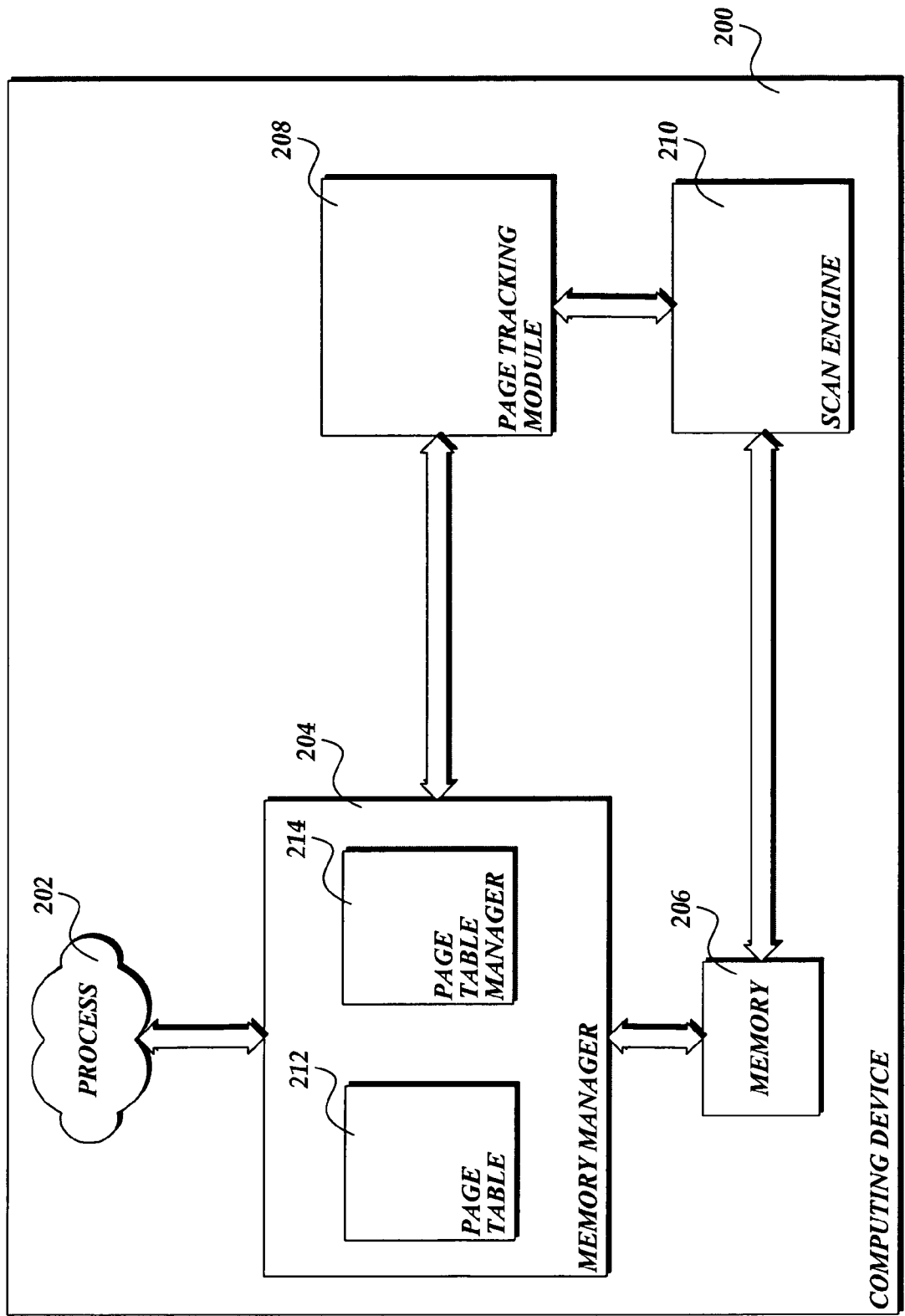
FIG. 2 is a block diagram that illustrates components of a computing device operative to scan for malware in memory before the malware is read and/or executed, in accordance with the present invention.

Referring now to FIG. 2, the following is intended to provide an exemplary overview of one suitable computing device 200 in which the present invention may be implemented. The computing device 200 may be any one of a variety of devices including, but not limited to, personal computing devices, server-based computing devices, personal digital assistants, cellular telephones, other electronic devices having some type of memory, and the like. For ease of illustration and because it is not important for an understanding of the present invention, FIG. 2 does not show the typical components of many computing devices, such as a CPU, keyboard, a mouse, a printer or other I/O devices, a display, etc. However, as illustrated in FIG. 2, the computing device 200 includes a process 202, a memory manager 204, memory 206, a page-tracking module 208, and a scan engine 210. Also, as illustrated in FIG. 2, the memory manager 204 includes a page table 212 and a page table manager 214. In general terms describing one embodiment of the present invention, components of the computing device 200 collectively provide the infrastructure needed to identify malware that is loaded in memory 206, even in instances when information in memory is modified as a result of program execution. By performing scans of memory for malware, the present invention is able to detect malware regardless of the entry point (e.g., network, I/O device, etc.) from which the malware gained access to the computing device.

As illustrated in FIG. 2, the computing device 200 includes a process 202. As known to those skilled in the art and others, when a program is scheduled for execution, an operating system represents the program internally as a process. Stated differently, the process 202 illustrated in FIG. 2 is a collection of data that contains all of the information needed to represent an executing program. Each process has associated data structures and other descriptive information required to implement the functionality of a program. Also, a process consists of state information that may be used to restart a program that becomes suspended.

As described previously, when a program is scheduled for execution, information associated with the program is loaded into memory 206, which is a "virtual" or software-implemented representation of physical memory. In this regard, the memory manager 204 provides an executing program (e.g., process) with a virtual memory address space that is based on a mapping to a physical memory address space. Stated differently, a process, such as process 202, references a virtual memory address space rather than a physical memory address space in order to store information. The memory manager 204 provides the virtual memory address space so that the amount of storage space available to a process is larger than physical memory. When a process actually executes, the virtual memory addresses used by the process are converted into physical memory addresses by the memory manager 204. In order to make the necessary translation, the memory manager 204 maintains a page table 212. Also, if information is loaded in the virtual address space but not in physical memory, the memory manager 204 causes the information to be "swapped" back into physical memory when the information is needed.

To facilitate the conversion between the virtual memory address space and the physical memory address space, the memory manager 204 divides the virtual memory address space into units known as pages. Those skilled in the art and others will recognize that a page is a contiguous section of memory 206 that is handled as a single entity. Modern CPUs store properties for each page in registers typically known as page table access bits. For example, some CPUs support an executable page table access bit that regulates whether a page loaded in memory 206 contains program code that may be executed by the CPU. If the executable bit associated with a page contains a value that is true, program code on the page may be executed. Conversely, if the executable bit associated with a page is false, program code on the page will not be executed by the CPU. Those skilled in the art and others will recognize that the other page table access bits function in a similar manner. In some types of computing devices, the values of the page table access bits associated with a page are stored in the page table 212. Even though the description of the present invention will primarily be described in the context of computing devices that maintain a page table 212, the embodiments described herein should be construed as exemplary and not limiting. Those skilled in the art and others will recognize that aspects of the present invention may be implemented in other types of computing devices that regulate access to data stored in memory.

As described in more detail below, page table access bits available from a CPU are used by the present invention to track the state of pages loaded in memory 206. The page table manager 214 is a component of the memory manager 204, which provides an interface to the page table 212. For example, to manipulate the values associated with a page's access bits, the page table manager 214 provides an interface to the page table 212 so that the page-tracking module 208 (described below) may identify and manipulate the values of a page's access bits.

As illustrated in FIG. 2, the computing device 200 includes a page-tracking module 208 that contains the software routines implemented by the present invention. The page-tracking module 208 utilizes page table access bits associated with a page loaded in memory 206 to track the state of the page. In order to access and manipulate the values of the page table access bits, the page-tracking module 208 uses the page table manager 214 to gain access to information stored in the page table 212. However, as known to those skilled in the art and others, commercially available CPUs do not necessarily support all of the same page table access bits. With regard to the present invention, the page-tracking module 208 may use up to four page table access bits to track the state of a page, including (1) a present bit, (2) a writable bit, (3) an executable bit, and (4) a readable bit. However, some commercially available CPUs do not support the four page table access bits that may be used by the page-tracking module 208. Thus, the page-tracking module 208 may implement different procedures to track the state of a page, depending on the page table access bits that are available.

In general terms describing one embodiment of the present invention, the page-tracking module 208 tracks the state of the pages loaded in memory in order to prevent malware from being executed. When the process 202 requests access to a page in memory, the page tracking module 208 utilizes the resources provided by computer hardware that regulates access to memory 206 to track the state of pages loaded in memory. More specifically, when a request to read, write, or execute information on a page occurs, the page tracking module 208 may change the value of page table access bits thereby modifying the access rights of the process 202 to that page of memory 206. When a page is first loaded in memory 206 or modified while in memory 206, the page is in a state that is not safe. In instances when a page is not in a safe state, the page tracking module 208 causes the scan engine 210 (described below) to search the page for malware prior to allowing the process 202 to execute and/or read information from the page. After, the page is searched for malware, the page table access bits that regulate the access rights of the process 202, including the ability of the process 202 to execute information on the page may be modified. More specifically, if the scan engine 210 does not identify malware on a page, the page transitions into a state that is deemed safe with an appropriate update to the page's access bits. While the page is in a safe state, information on the page may be read and/or executed. However, if information is written to the page or the contents of the page are otherwise modified, then the page transitions back to a state that is not safe with an appropriate update to the page's access bits. If the information on a page is identified as malware by the scan engine 210, a page will not transition into a "safe" state. Instead, the page tracking module 208 will perform exception processing that may include, but is not limited to, killing the process 202, shutting down the operating system, reporting the infection, and notifying the user of the malware.

As further illustrated in FIG. 2, the computing device 200 includes a scan engine 210 designed to detect malware that is loaded in memory 206. Many different software vendors include a scan engine or equivalent mechanism in antivirus software that is designed to identify information characteristic of malware. One known technique employed by some existing antivirus software vendors for identifying malware includes obtaining a copy of the malware "in the wild." Then program code or a characteristic subset of the entire program code that implements the malware is processed with a hash function that converts the program code into a signature operative to uniquely identify the malware. Then, in response to an event such as an I/O request, the scan engine searches information associated with the request for any known malware signatures. The scan engine 210 may employ this known technique to scan the contents of memory 206 for a malware signature.

As mentioned previously, the scan engine 210 searches memory 206 for information characteristic of malware. Since the contents of memory 206 are scanned instead of information that is stored on an I/O device, new malware detection techniques may be employed by the scan engine 210 to detect malware. More specifically, some context-specific knowledge about information loaded in memory is maintained by the memory manager 204. For example, as known to those skilled in the art and others, the memory manager 204 tracks whether a page loaded in memory contains user data, executable program code, or data used by the operating system, etc. The context-specific knowledge available from the memory manager 204 may be helpful in implementing heuristic malware detection techniques.

By employing heuristic malware detection techniques, the scan engine 210 may be more effective than existing technologies in detecting previously unknown malware. Stated differently, while there are many different ways for malware to gain access to the computing device 200 and prevent a malware signature from being detected, there is a limited set of techniques used by malware to perform malicious acts. For example, in order to perform a malicious act, malware needs to be loaded in memory. Also, malware will typically need to perform one or more types of operations, such as a system call to an operating system. As a result, developing heuristics that searches memory and identifies information used to implement malicious acts may be more effective than signature-based scanning that searches multiple entry points used by malware to gain access to a computing device.

In instances when the computing device 200 supports an executable page table access bit or is otherwise capable of distinguishing between executable and non-executable information in memory, the performance of the scan engine 210 may be significantly improved over existing systems. Typically a scan engine will search all incoming information for malware, including information that is incapable of being executed. For example, if a computer user downloads an e-mail message with an attachment that only contains user data and not executable program code, existing antivirus software may cause a scan engine to search all of the information included in the e-mail. However, some incoming information may not be capable of exposing a computing device to malware. In this instance, the nonexecutable user data cannot cause damage to the computing device. Since the present invention scans data in memory, the scan engine 210 may be configured to only scan executable information that is capable of exposing a computing device to the effects of malware.

In instances when the computing device 100 is capable of distinguishing between executable and nonexecutable information in memory, the probability that the scan engine 210 will generate a false positive in which information is incorrectly identified as malware may be reduced. The knowledge that a page contains information that will not be executed (i.e, a "code page"), may be used by the scan engine 210 to analyze the page differently than a page that contains executable information. For example, since information on a code page will not be executed, the scan engine 210 may be more conservative when making a determination that information on the page is malware.

As known to those skilled in the art and others, FIG. 2 is a simplified example of one computing device 200 capable of performing the functions implemented by the present invention. However, actual embodiments of the computing device 200 will have additional components not illustrated in FIG. 2 or described in the accompanying text. Also, FIG. 2 shows one component architecture for identifying malware loaded in memory, but other component architectures are possible.

A system that searches for malware in computer memory needs to account for modifications made to the contents of memory caused by program execution. Stated differently, if antivirus software only performed a scan for malware when information was first loaded into memory, many known exploits could circumvent the protections offered by the antivirus software. For example, information may be encrypted when loaded into memory so that a scan of the encrypted information will not match any known malware signatures. As a result of program execution, a malware payload that implements the malicious functionality of the malware may be decrypted, thereby overwriting the current contents of memory. One method to prevent the contents of memory from being modified as a result of program execution is to make information in memory that was scanned by antivirus software as "read-only." However, as mentioned above, this solution would interfere with the normal operation of a modern computing device, since many application programs have legitimate purposes for having self-modifying code.

One method to identify malware in memory, including malware that is written to memory as a result of program execution, is to perform a scan each time information is written to memory. As known to those skilled in the art and others, interrupting program execution to scan for malware requires significant computational overhead. For example, program execution may be interrupted with a page fault each time a byte of information is written to memory. The page fault could transfer the flow of execution to antivirus software so that the page in memory that was modified may be scanned for malware. However, generating a page fault each time information is written to memory would result in an unacceptable performance degradation. More specifically, interrupting program execution in this way would slow execution time for some bona fide application programs by several orders of magnitude.

Aspects of the present invention are directed to scanning information in memory without causing a significant performance degradation of a computing device. As mentioned previously, the present invention may use up to four page table access bits available from a CPU to track the state of a page loaded in memory, including (1) a present bit, (2) a writable bit, (3) an executable bit, and (4) a readable bit. The page table access bits allow the present invention to track the state of a page in memory and defer performing a scan for malware until the scan is needed. However, since CPUs do not all provide the same page table access bits, actions performed by the present invention to track the state of a page may vary, depending on the capabilities of the computing device.

Now with reference to FIG. 3, a flow diagram that illustrates one exemplary embodiment of page-tracking method 300 formed in accordance with the present invention will be described. In summary, the page-tracking method 300 identifies information characteristic of malware from pages that are directly loaded and/or modified in memory. The method 300 is able to determine when to scan for malware by tracking the state of pages loaded in memory. More specifically, when a request to access a page, such as a request to read, write, or execute information on a page occurs, the method 300 changes the value of page table access bits to represent the state of the page. In some instances, when a request to access a page occurs, the method 300 causes a scan for malware to be performed. However, the scan is only performed in instances when the scan is needed to prevent exposing a computing device to the effects of malware. With continuing reference to FIGS. 1-2 and the accompanying descriptions, an exemplary page-tracking method 300 illustrated in FIG. 3 will now be described.

Figure 3:
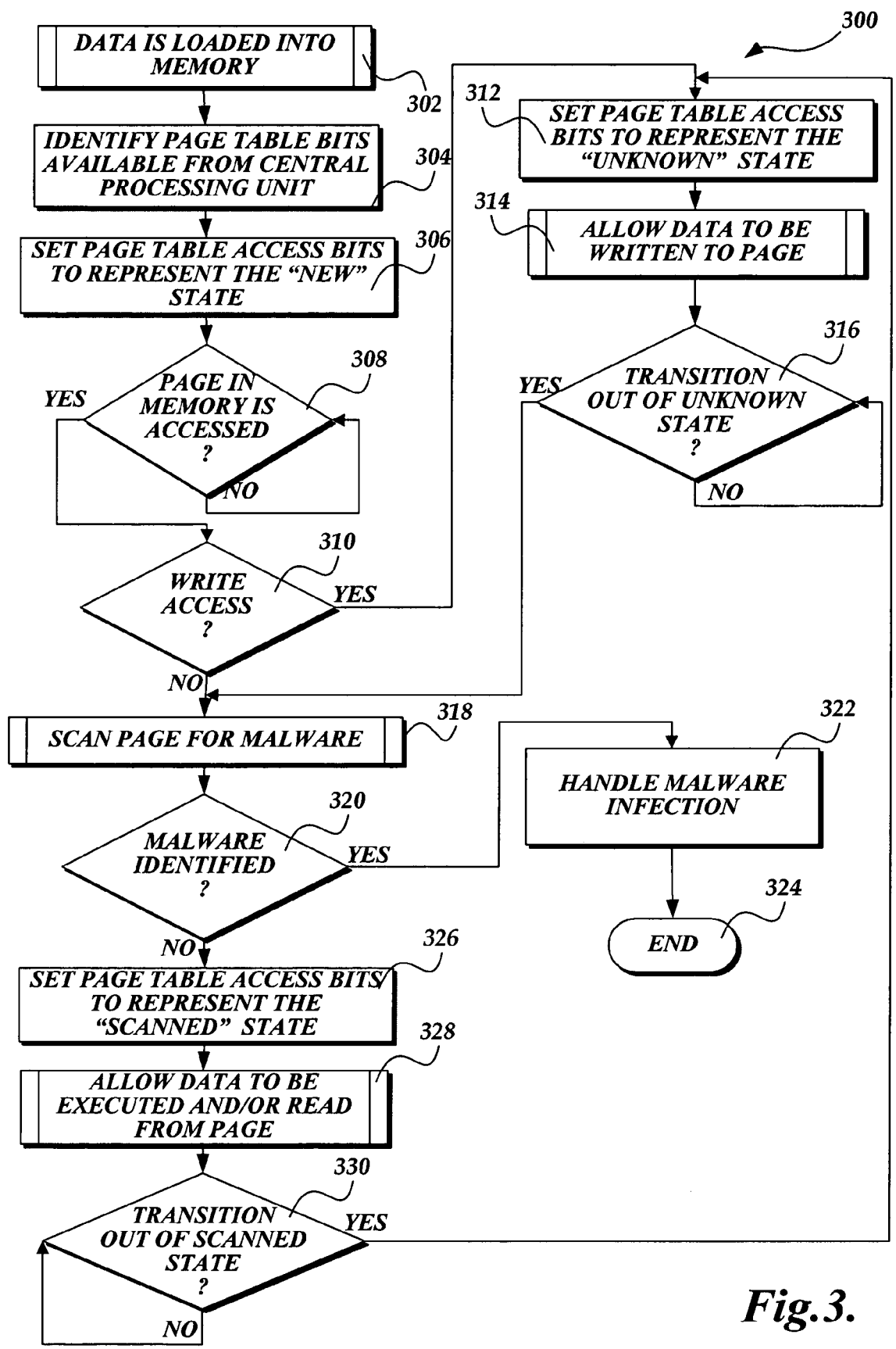
FIG. 3 is a flow diagram illustrating an exemplary embodiment of a method that tracks the state of pages loaded in memory and causes a scan for malware to be performed before a computing device is exposed to the effects of malware, in accordance with the present invention.

As illustrated in FIG. 3, the page-tracking method 300 begins at block 302, where one or more page(s) of information is loaded into memory by the memory manager 204 (FIG. 2). Typically, executable programs are constructed by combining segments of program code obtained from different sources. When a program is scheduled for execution, the memory manager 204 initializes a memory address space for the program. Then the information used by the program is typically loaded from an I/O device (i.e., hard drive) into memory. Since information may be loaded into memory at block 302 using methods that are generally known in the art, further description of these methods will not be described in detail here. Also, when information is loaded into memory at block 302, a scan of the information for malware may be performed. As mentioned previously, a scan performed when information is accessed from an I/O device will identify some malware that does not employ certain stealth techniques.

At block 304, the page-tracking method 300 identifies the page table access bits that are available from the CPU. As mentioned above, the present invention may use (1) a present bit, (2) a writable bit, (3) an executable bit, and (4) a readable bit to track the state of pages loaded in memory. Those skilled in the art will recognize that a present bit is typically used to determine if a page is available from memory. For example, a page that a process attempts to access from memory may be "swapped out" or not stored in physical memory. In this instance, the present bit is set to false, which signifies that the page needs to be loaded into physical memory before information on the page may be accessed. The mechanism used to interrupt program execution and initiate the process of loading a page into memory in this instance is typically referred to as a page fault. Similarly, program code that causes a page to be loaded into memory when a page fault occurs is typically referred to as a page fault handler. When a page is loaded into memory by a page fault handler, the present bit is set to true, thereby signifying that the page is available. Most, if not all, modern processors support a writable bit that indicates whether a CPU will allow information to be written to a page. Stated differently, if the writable bit associated with a page is set to true, information may be written to the page. By contrast, if the writable bit is set to false, the CPU will not allow information to be written to the page. Similarly, an executable bit is supported by some CPUs, which signifies whether a page contains program code that may be executed. Finally, a CPU may support a readable bit that indicates whether a page in memory may be read. Since the page table access bits available from a CPU may be identified at block 304 using techniques generally known in the art, further description of these techniques will not be provided here.

The page-tracking method 300 described with reference to FIG. 3 will primarily be described in the context of two types of computing devices. More specifically, in one embodiment of the present invention, the page-tracking module 300 is implemented in a computing device that supports all of the page table access bits described above namely, the (1) present bit, (2) writable bit, (3) executable bit, and (4) a readable bit (hereinafter referred to as a "readable-bit computing device"). In another embodiment, the method 300 is implemented in a computing device that supports a (1) present bit, (2) writable bit, and (3) executable bit, but not a readable bit (hereinafter referred to as an "executable-bit computing device").

As described in more detail below, in one embodiment of the present invention, information in memory is scanned for malware when a process attempts to read and/or execute information on a page that is not in a safe state. This embodiment may only be implemented in a computing device that supports a readable bit. By contrast, in another embodiment of the present invention, typically implemented in an executable-bit computing device, information in memory is scanned for malware only when a process attempts to execute information on a page that is not in a safe state. As a result, fewer scans for malware are performed in this embodiment, thereby minimizing the performance impact of the present invention on the computing device. However, if information in memory is scanned for malware when a process attempts to read and/or execute information on a page that is not in a safe state, the present invention is able to identify malware contained on "nonexecutable" pages.

Figure 4:
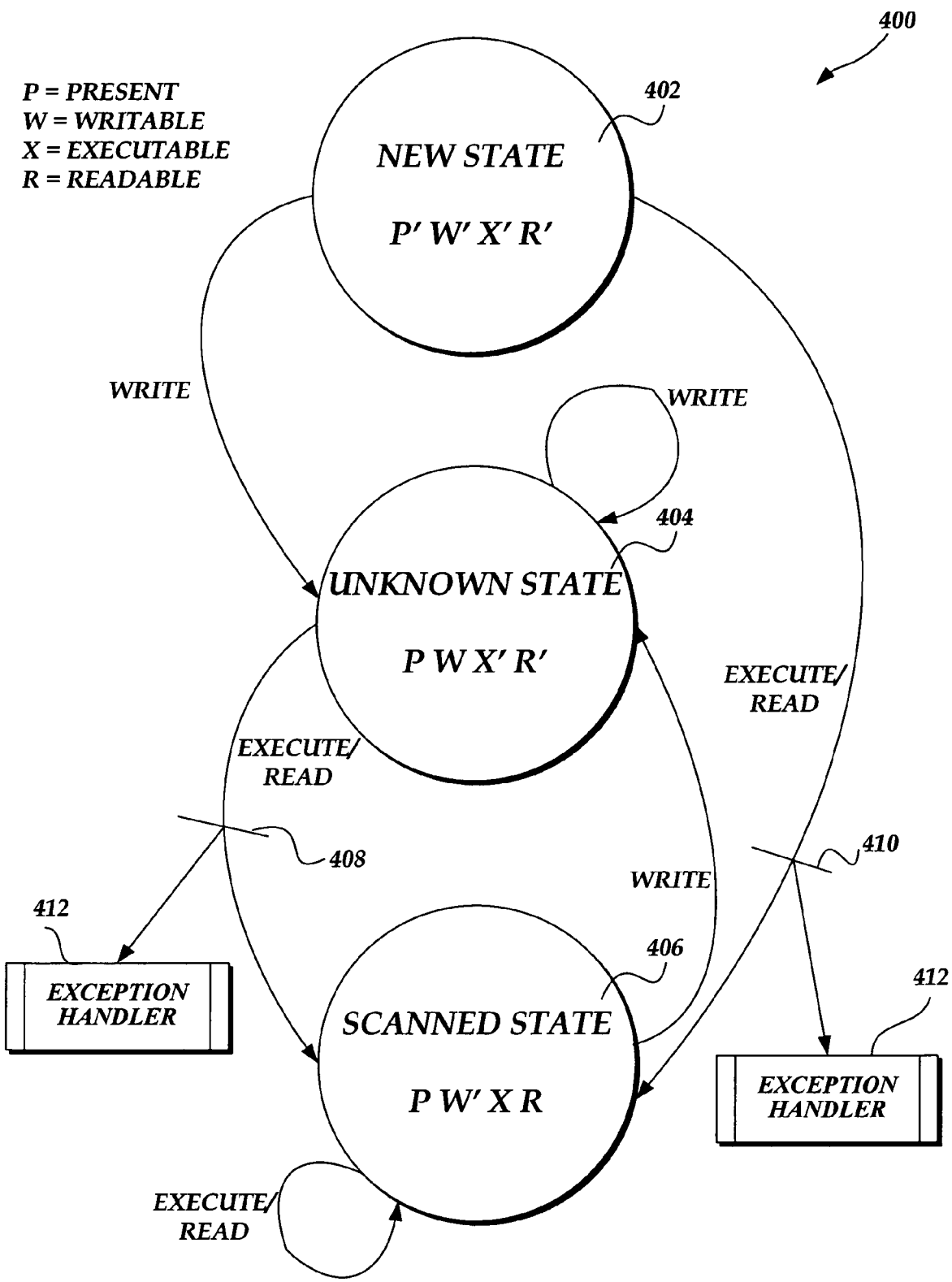
FIG. 4 is a state diagram that illustrates states and transitions between states in a computing device that includes a readable, executable, writable, and present page table access bits.
Figure 5:
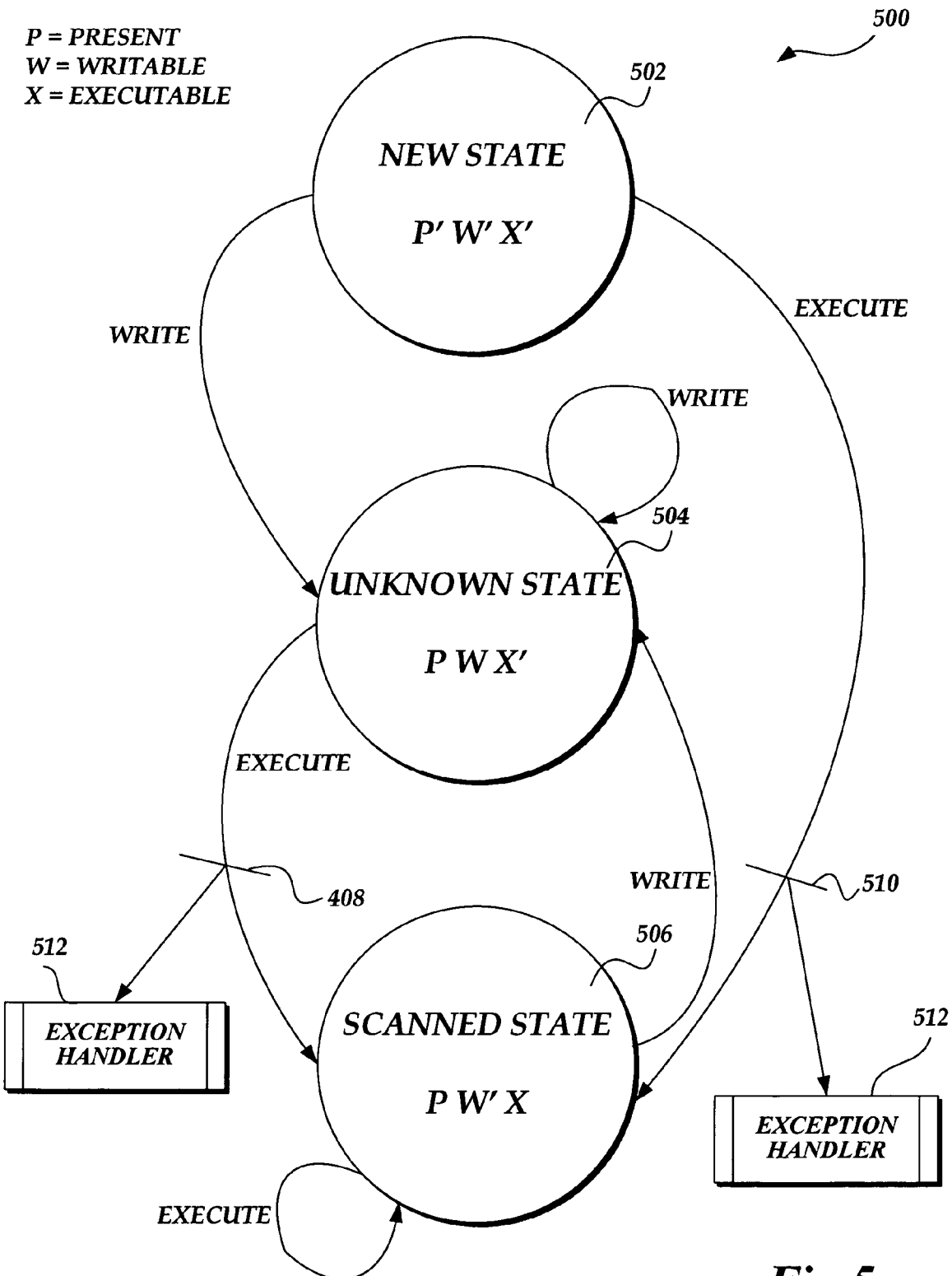
FIG. 5 is a state diagram that illustrates the different states and transitions between states in a computing device that includes executable, writable, and present page table access bits.

The page-tracking method 300, at block 306, sets the value of page table access bits associated with the pages loaded in memory at block 302. When a page of information is loaded into memory, the page table access bits associated with the page are assigned values that indicate the page is in a "new" state. In a readable-bit computing device, the "new" state is represented with the present bit, writable bit, executable bit, and readable bit all being set to false. In the alternative embodiment that involves an executable-bit computing device, the "new" state is represented with the present bit, writable bit, and executable bit being set to false. The values assigned to a page's access bits in a readable and executable-bit computing device are illustrated in FIGS. 4 and 5 and described in further detail below. In any event, at block 306, the page-tracking method 300 sets the values of the page table access bits to represent a "new" state by issuing one or more commands to the page table manager 214 (FIG. 2). As mentioned previously, the page table manager 214 provides an interface to the page table 212 so that values associated with a page's access bits may be modified. Those skilled in the art will recognize that when a page is in the new state, an access to the page will cause program execution to be interrupted and execution flow transferred to a page fault handler.

At decision block 308, the page-tracking method 300 remains idle and waits for a page loaded in memory to be accessed in a way that will cause a state change. In a readable-bit computing device, a page access that will initiate a state change includes instances when a write, read, or execution operation is scheduled to be performed. In an executable-bit computing device, page accesses that will initiate a state change include instances when a write or execution operation is scheduled to be performed. In some instances, a state change only occurs after the page being accessed is scanned for malware. In other instances, a scan of the page being accessed is not necessary, as the requested access is not capable of exposing a computing device to the effects of malware.

At decision block 310, the page-tracking method 300 determines whether the access received at block 308 is an instance where information is scheduled to be written to a page in memory. As mentioned previously, information may be written to memory using many mechanisms, including, but not limited to, executing program code that causes information to be decrypted. The page-tracking method 300 will cause information written to memory by any method to be scanned for malware before the information is capable of causing harm to a computing device. As illustrated in FIG. 3, if the access received at block 308 is an access where information is scheduled to be written to a page in memory, the method 300 proceeds to block 312. Conversely, if the access identified at block 308 is not an instance where information is scheduled to be written to a page in memory, the method 300 proceeds to block 318.

The page-tracking method 300, at block 312, sets the value of page table access bits associated with the page that was scheduled to be accessed with a write operation to represent the "unknown" state. In order to set the values of the page table access bits to represent the unknown state, program execution is interrupted with a page fault and one or more commands are issued to the page table manager 214 (FIG. 2). In a readable-bit computing device, the unknown state is represented with the present bit and writable bit being set to true, and the executable bit and readable bit being set to false. In the alternative embodiment that involves an executable-bit computing device, the "unknown" state is represented with the present bit and writable bit being set to true and the executable bit being set to false.

As illustrated in FIG. 3, the page-tracking method 300, at block 314, allows information to be written to a page that is in the unknown state. By setting the value of the writable page table access bit to true, a page fault will not be generated when information is written to a page that is in the unknown state.

Instead, existing systems provide services so that information may be written to a page that is in the unknown state. At block 314, the existing systems are allowed to provide these services without interference from the present invention.

At block 316, the page-tracking method 300 remains idle and waits for a page access that will cause a transition out of the unknown state. By setting the value of a page table access bit to false, an interrupt in program execution will be generated when the type of access regulated by a page table access bit occurs. Thus, in a readable-bit computing device, when an access is identified that is either an attempt to read or execute information on a page in the unknown state, an interrupt in program execution occurs. In the alternative embodiment that involves an executable-bit computing device, an attempt to execute information on a page in the unknown state will generate a page fault that interrupts program execution. In either instance, when a page access occurs that generates an interrupt, the computing device may be exposed to malware if the access is satisfied. Thus, before the page access is satisfied and the page transitions out of the unknown state, the page will be scanned for malware.

As illustrated in FIG. 3, at block 318, the page-tracking method 300 scans the page that is scheduled to be accessed for malware. As mentioned previously, software-implemented routines in the scan engine 210 (FIG. 2) are used to scan a page for malware. In one embodiment of the present invention, the scan performed at block 318 includes matching patterns of information to a malware "signature." However, the scan may include additional malware identification methods. For example, as mentioned previously, searching information in memory for malware provides a context that may be helpful in implementing heuristic malware identification methods. Thus, the scan performed at block 318 may include identifying heuristic factors that are characteristic of malware. However, it should be well understood that the techniques for identifying malware described above should be construed as exemplary and not limiting. The page-tracking method 300 may be implemented with any number of malware detection techniques not described herein.

As illustrated in FIG. 3, at block 320, the page-tracking method 300 determines whether a page in memory was identified as being infected with malware at block 318. If a malware infection was identified, the method 300 proceeds to perform actions that are generally known in the art for handling a malware infection at block 322. Then, the method 300 proceeds to block 324, where it terminates. Conversely, if a malware infection was not identified at block 318, the page-tracking method 300 proceeds to block 326.

The page-tracking method 300, at block 326, sets the value of page table access bits associated with the page that was scanned at block 318 to represent the "scanned" state. In a readable-bit computing device, the scanned state is represented with the present bit, readable bit, and executable bit being set to true and the writable bit being set to false. In the alternative embodiment that involves an executable-bit computing device, the scanned state is represented with the present bit and executable bit being set to true and the writable bit being set to false. At block 312, the page-tracking method 300 sets the values of the page table access bits to represent the "scanned" state by issuing one or more commands to the page table manager 214 (FIG. 2).

As illustrated in FIG. 3, the page-tracking method 300, at block 328, allows information to be read and/or executed from a page that is in the scanned state. By setting the value of the readable and executable page table access bits to true in a readable-bit computing device, a page fault will not be generated when attempts to read or execute information from a page occur. Similarly, by setting the value of the executable page table access bit to true in an executable-bit computing device, a page fault that interrupts program execution will not occur when information from a page in the scanned state is schedule for execution. Instead, existing systems provide services, at block 328, so that information may be read and/or executed from a page in the scanned state.

At block 330, the page-tracking method 300 remains idle and waits for a page access that will cause a transition out of the scanned state. In both readable-bit and executable-bit computing devices, when information is written to a page, the page will transition out of the scanned state to the unknown state. As mentioned previously, information may be written to memory using many mechanisms, including, but not limited to, executing program code that causes information to be decrypted. The page-tracking method 300 will cause information written to memory by any method to be scanned for malware before the information is capable of causing harm to a computing device. More specifically, when a write operation is scheduled, at block 330, a page fault is generated that interrupts program execution so that the page table access bits associated with the page may be changed to values representative of the unknown state. Thus, if the access received at block 330 is an instance where information is scheduled to be written to a page, the method 300 proceeds to block 312, described above.

In alternative embodiments of the page-tracking method 300, steps may be added or removed from the method 300 without departing from the scope of the present invention. For example, if malware is identified at block 320, the method 300 may cause additional actions to be performed than those described above. For example, the method 300 will typically perform exception processing that may include, but is not limited to, killing one or more processes, shutting down the operating system, reporting the infection, and notifying the user of the malware. Also, all information associated with the malware may be removed from the computing device or information may be "quarantined" so that the malware is incapable of causing harm to the computing device. Thus, the method 300 depicted in FIG. 3 provides just one example of the manner in which one embodiment of the page-tracking method 300 may be implemented.

Now with reference to FIGS. 4 and 5, state diagrams that illustrate aspects of the present invention will be described. As mentioned previously, the present invention tracks the state of a page loaded into the memory so that a scan may be performed before a computing device is exposed to the effects of malware. Now with reference to FIG. 4, a state diagram 400 that illustrates the different page states and transitions between page states in a readable-bit computing device will be described. As illustrated in FIG. 4, a page in a readable-bit computing device that implements the present invention may be in one of three states when loaded in memory, including the "NEW STATE" 402, "UNKNOWN STATE" 404, and "SCANNED STATE" 406. Each state depicted in FIG. 4 includes the values of the page table access bits that are used to represent the state. More specifically, as mentioned above with reference to FIG. 3, when a page is in the new state 402, in a readable-bit computing device, the values of the present bit ("P"), writable bit ("W"), executable bit ("E"), and readable bit ("R") are all false. In FIGS. 4 and 5, when a page table access bit has a value of false, an apostrophe is placed adjacent to the representation of the page table access bit. Conversely, if a page table access bit has a value that is true, the representation of the page table access bit does not have an adjacent apostrophe marking. As further illustrated in FIG. 4, when a page is in the unknown state 404, the values of the present bit and writable bit are true and the values of the executable bit and readable bits are false. Also, when a page is in the scanned state 406, the values of the present bit, executable bit, and readable bit are true and the value of the writable bit is false.

As further illustrated in FIG. 4, a page in a readable-bit computing device changes states when specified events occur. More specifically, arrows are drawn on FIG. 4 that show the events that cause a transition in page state. Thus, when a page is in the new state 402 and information is written to the page, a transition to the unknown state 404 will occur. Also, when information is read or executed from a page in the new state 402, a transition to the scanned state 406 will occur. As further illustrated in FIG. 4, when a page is in the unknown state 404, information may be written to the page without causing a transition out of the unknown state 404. However, before information is read or executed from a page in the unknown state 404, a transition to the scanned state 406 will occur. As mentioned above with reference to FIG. 3, prior to a page transitioning to the scanned state 406—either from the new state 402 or the unknown state 404—the page is scanned for malware, as indicated by the scan events 408 and 410 illustrated in FIG. 4. Only if malware is not identified on the page will the page complete the transition to the scanned state 406. Conversely, if malware is identified by either scan event 408 or 410, exception processing will be performed after the page transitions to the exception handler 412. As illustrated in FIG. 4, when a page is in the scanned state 406, information may be read and/or executed from the page without program execution being interrupted. However, if information is written to a page in the scanned state 406, the page will transition back to the unknown state 404.

Now with reference to FIG. 5, a state diagram 500 that illustrates the states and transitions between states in an executable-bit computing device will be described. Much of the description provided with reference to FIG. 5 is similar to the description provided above with reference to a readable-bit computing device depicted in FIG. 4. However, since an executable-bit computing device does not support a readable bit, transitions between states do not occur when information is read from a page. However, similar to a readable-bit computing device, a page in an executable-bit computing device that implements the present invention may be in one of three states when loaded in memory, including the "NEW STATE" 502, "UNKNOWN STATE" 504, and "SCANNED STATE" 506. Similar to a readable-bit computing device, each state depicted in FIG. 5 includes the values of the page table access bits that are used to represent the state. Thus, when a page is in the new state 502, the values of the present bit ("P"), writable bit ("W"), and executable bit ("E") are all false. As further illustrated in FIG. 5, when a page is in the unknown state 504, the values of the present bit and writable bit are true and the value of the executable bit is false. Also, when a page is in the scanned state 506, the values of the present bit and executable bit are true and the value of the writable bit is false.

Similar to FIG. 4, arrows between the different states in FIG. 5 show the events that cause a transition in page state. Thus, when a page is in the new state 502 and information is scheduled to be written to the page, a transition to the unknown state 504 will occur. As further illustrated in FIG. 5, when a page is in the unknown state 504, information may be written to the page without transitioning out of the unknown state 504. However, when information is scheduled to be executed from a page in the unknown state 504 or in the new state 502, a transition to the scanned state 506 will occur. Similar to a readable-bit computing device, before a page transitions to the scanned state 506, the page is scanned for malware, as indicated by the scan events 508 and 510. Only if malware is not identified on the page will information on the page be executed. Conversely, if malware is identified by either scan event 508 or 510, exception processing will be performed by the exception handler 512. If a page reaches the scanned state 506, information may be executed from the page without causing an additional scan for malware to be performed. However, if information is written to a page that is in the scanned state 506, the page will transition back to the unknown state 504.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for identifying malware from pages of information temporarily stored in a memory, the method comprising:

regulating the ability of a computer-executable process to access the information pages stored in the memory;

when the computer-executable process requests access to the information pages in a non-regulated manner, complying with the request;

when the computer-executable process requests access to the information pages in a regulated manner, handling the request through execution of a software routine stored in a memory;

prior to scanning for malware, accessing each information page to determine whether each information page is capable of exposing the computer to malware, wherein pages capable of exposing the computer to malware cause a state change, generate an interrupt, or are otherwise executable, such that only information pages that are capable of exposing the computer to malware are scanned for malware and pages that are incapable of exposing the computer system to malware are not scanned for malware; and upon determining that the accessed information page is capable of exposing the computer to malware, performing the following:

deferring scanning the accessed information page for malware by tracking a state of the information page stored in the memory until the computer system determines that the information page is in a not-safe state, the not-safe state comprising at least one of when the information page is first loaded into the memory and when the information page is modified while in memory, wherein the not-safe state indicates the information page is potentially infected with malware; and based on a determination that the information page is in a not-safe state, scanning the information page stored in the memory for malware, when scanning the information page stored in the memory identifies malware, removing the malware before execution of the computer-executable process continues, wherein scanning the information page includes matching patterns of the information page to a malware signature.

2. The method as recited in claim 1, wherein the software routine, when executed, performs the following acts:

scanning the information page stored in a memory for malware when complying with the request facilitates exposure thereto; and updating data that regulates the ability of the computer-executable process to access the information page stored in a memory.

3. The method as recited in claim 1, wherein regulating the ability of the computer-executable process to access the information page stored in a memory includes changing the value of page table access bits controlling access to the information page stored in the memory.

4. The method as recited in claim 3, further comprising:

if the page table access bits associated with the information page stored in the memory allow a requested type of access, granting the request; and if page table access bits associated with the information page stored in the memory do not allow a requested type of access, executing a page fault handler.

5. The method as recited in claim 4, wherein when granting the request has the potential for exposure to malware, executing the page fault handler causes the following acts:
scanning the information page for malware; and
updating the page table access bits associated with the information page stored in the memory to indicate that the page is in a safe state when scanning the information stored in the memory fails to identify malware.

6. The method as recited in claim 5, wherein executing the page fault handler further causes the act of setting a writable access bit to false to indicate that the page is in a safe state.

7. The method as recited in claim 4, wherein when granting the request does not have the potential for exposure to malware, executing the page fault handler further causes the act of updating the page table access bits associated with the information page stored in the memory to indicate that the page is not in a safe state.

8. The method as recited in claim 7, wherein executing the page fault handler further causes the act of setting an executable access bit to false to indicate that the page is not in a safe state.

9. The method as recited in claim 3, wherein:
the page table access bits for the page include a present bit, a writable bit, and an executable bit;
the page is in one of a first state, a second state, or a third state;
a transition to the first state occurs when the page is loaded into memory;
a transition to the second state occurs when the page is in either the first state or the third state and the request to access the page will cause information to be written to the page; and
a transition to the third state occurs when the page is in either the first state or the second state and information on the page is scheduled to be at least one of read or executed.

10. The method as recited in claim 9, further comprising scanning the page for malware before the page transitions to the third state.

11. The method as recited in claim 1, when scanning the information stored in the memory identifies malware processing an exception that terminates execution of the computer-executable process.

12. A computer-implemented system that identifies malware on a computing device, the system comprising:
a scan engine that scans a page of information stored in a memory for a signature characteristic of malware;
a memory that stores information utilized by a computer-executable application in execution;
an accessing module for accessing each information page, prior to scanning for malware, to determine whether each information page is capable of exposing the computer to malware, wherein pages capable of exposing the computer to malware cause a state change, generate an interrupt, or are otherwise executable, such that only information pages that are capable of exposing the computer to malware are scanned for malware and pages that are incapable of exposing the computer system to malware are not scanned for malware; and
a component that, upon determining that the accessed information page is capable of exposing the computer to malware, performs the following:
deferring scanning the accessed information page for malware by tracking a state of the information page stored in the memory until the computer system determines that the information page is in a not-safe state, the not-safe state comprising at least one of when the information page is first loaded into the memory and when the information page is modified while in memory, wherein the not-safe state indicates the information page is potentially infected with malware; and
based on a determination that the information page is in a not-safe state, scans the information page stored in the memory for malware, when scanning the information page stored in the memory identifies malware, removing the malware before execution of the computer-executable process continues, wherein scanning the information page includes matching patterns of the information page to a malware signature.

13. The computer-implemented system as recited in claim 12, further comprising a memory manager that interfaces the component that tracks the state of the page stored in the memory to change the values of page table access bits associated with the page table access bits associated with the page of information.

14. The computer-implemented system as recited in claim 13, wherein the scan engine relies on heuristics techniques to identify malware on a page of information stored in a memory.

15. The computer-implemented system as recited in claim 13, wherein the component that tracks the state of the page stored in the memory is configured to track the state of the page stored in memory through access bits available from a page table that defines a program's ability to access a page in the memory.

16. A computer-readable recording medium having instructions stored thereon that, when executed by a processor, cause the processor to perform the following acts:
prior to scanning for malware, accessing each information page to determine whether each information page is capable of exposing the computer to malware, wherein pages capable of exposing the computer to malware cause a state change, generate an interrupt, or are otherwise executable, such that only information pages that are capable of exposing the computer to malware are scanned for malware and pages that are incapable of exposing the computer system to malware are not scanned for malware; and
upon determining that the accessed information page is capable of exposing the computer to malware, performing the following:
deferring scanning the accessed information page for malware by tracking a state of the information page stored in the memory until the computer system determines that the information page is in a not-safe state, the not-safe state comprising at least one of when the information page is first loaded into the memory and when the information page is modified while in memory, wherein the not-safe state indicates the information page is potentially infected with malware; and
based on a determination that the information page is in a not-safe state, scanning the information page stored in the memory for malware, when scanning the information page stored in the memory identifies malware, removing the malware before execution of the computer-executable process continues, wherein scanning the information page includes matching patterns of the information page to a malware signature.

17. The method as recited in claim 1, when scanning the information stored in the memory identifies malware, processing an exception that at least one of shuts down an operating system that executes the computer-executable process, reports a malware infection, or notifies a user of the malware.

* * * * *